Figure 1:
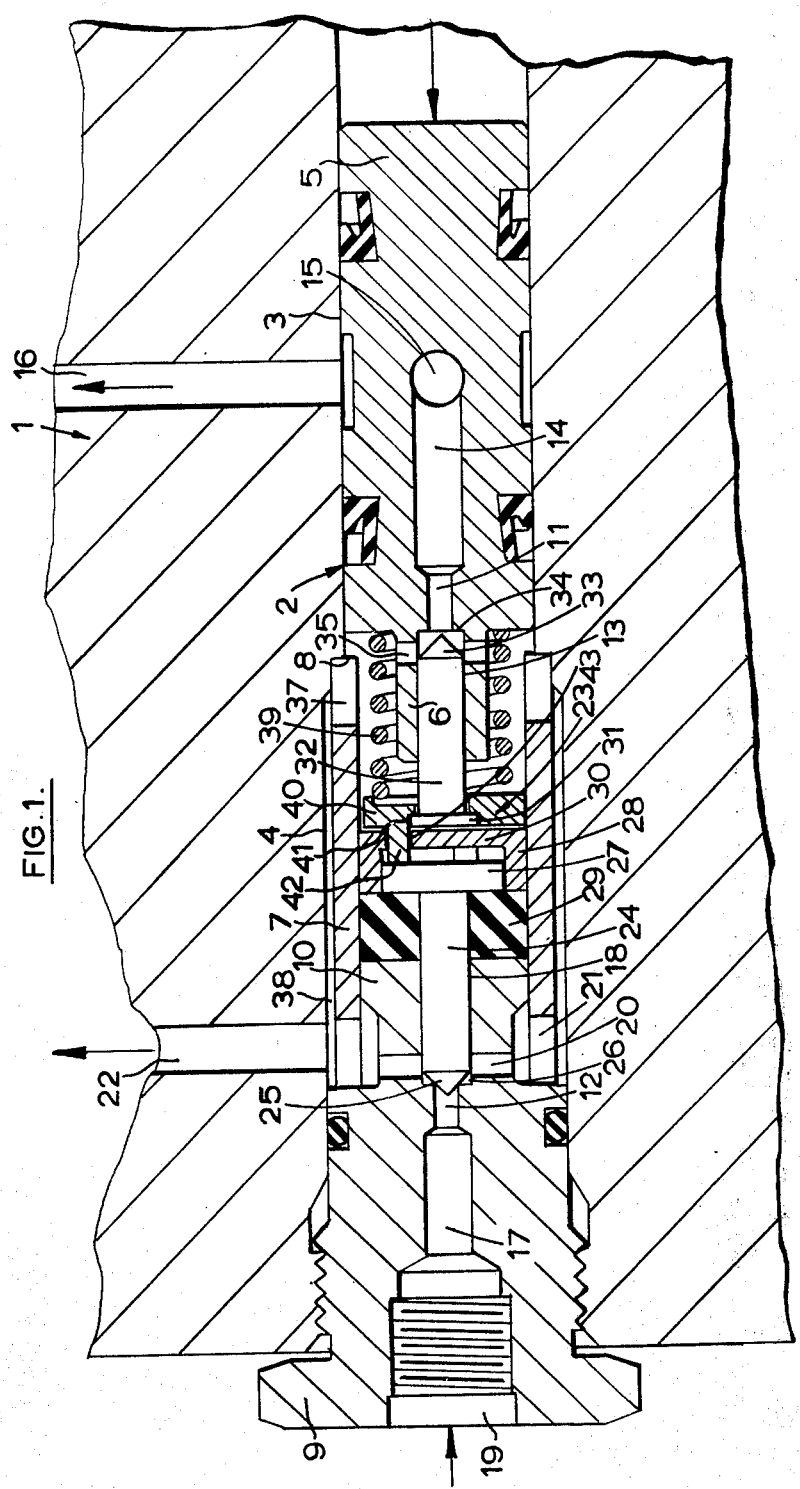

United States Patent [19]
Farr

[11] 3,941,155
[45] Mar. 2, 1976

[54] HYDRAULIC CONTROL VALVE ASSEMBLIES
[75] Inventor: Glyn Philip Reginald Farr, Kenilworth, England
[73] Assignee: Girling Limited, Birmingham, England
[22] Filed: Apr. 23, 1974
[21] Appl. No.: 463,241

[30] Foreign Application Priority Data
Apr. 24, 1973 United Kingdom............... 19458/73

[52] U.S. Cl. ...... 137/627.5; 137/596.1; 137/596.18
[51] Int. Cl.[2] ........................................ F15B 13/042
[58] Field of Search ...... 91/457; 137/596.18, 627.5, 137/596, 596.1; 251/63.4, 77

[56] References Cited
UNITED STATES PATENTS

| | | | |
|---|---|---|---|
| 817,277 | 4/1906 | Saugstad..................... | 137/596.18 X |
| 1,146,009 | 7/1915 | Mason ............................. | 251/35 X |
| 2,882,930 | 4/1959 | Lee................................. | 137/596.18 |
| 3,055,345 | 9/1962 | Johnson...................... | 137/596.14 X |
| 3,232,311 | 2/1966 | Doolittle et al............ | 137/596.18 X |

*Primary Examiner*—Alan Cohan
*Assistant Examiner*—Gerald A. Michalsky
*Attorney, Agent, or Firm*—Scrivener Parker Scrivener and Clarke

[57]  ABSTRACT

In a control valve assembly operation of inlet and exhaust valves is controlled by a valve-operating assembly which is common to both valves and which is responsive to movement of a piston, and a reversing mechanism incorporated in the valve-operating assembly is constructed and arranged to effect positive movement of a valve in a direction opposite to that in which the piston is being moved axially.

10 Claims, 2 Drawing Figures

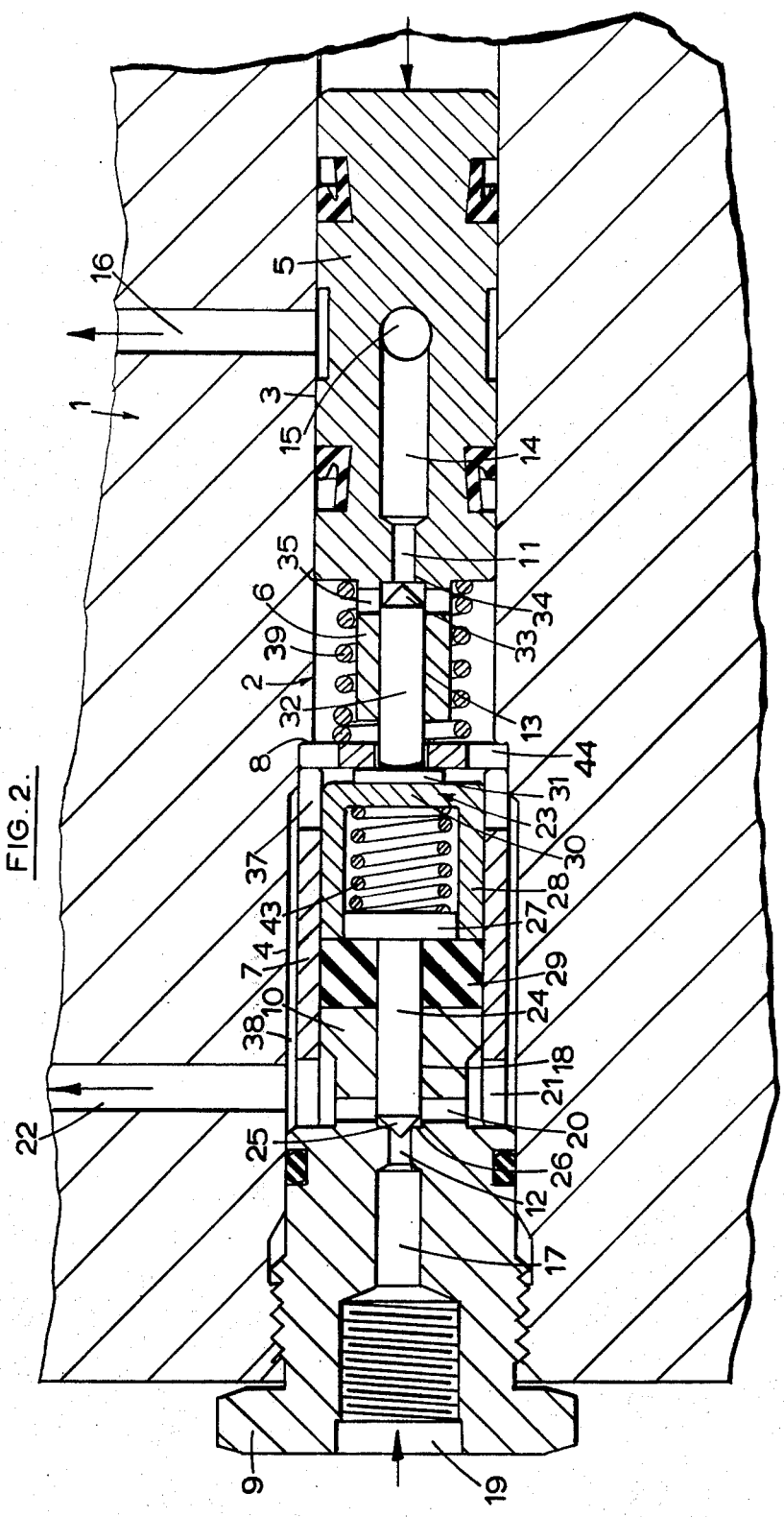

HYDRAULIC CONTROL VALVE ASSEMBLIES

This invention relates to a new or improved fluid control valve assembly of the kind in which communication between an inlet port in a housing for connection to a source of fluid under pressure and an outlet port is controlled by an inlet valve which is opened when a positively actuated piston is advanced in a bore in the housing and, in a normal retracted position, the inlet valve is closed and the outlet port is in communication with an exhaust port for connection to a reservoir for fluid through a normally open exhaust valve which, when the piston is advanced in the bore, closes before the inlet valve is opened.

In a control valve assembly of the kind set forth in order to ensure sensitivity of operation of the inlet valve in response to operation of the piston it is desirable for the assembly to be operable in response to light loads applied to the piston. Hitherto this has been achieved by arranging for the inlet valve to be spring urged into the closed position by means of a spring acting in opposition to fluid pressure. In such a known arrangement the inlet valve and the exhaust valve are either arranged in parallel or are opposed in an axially spaced configuration, preferably co-axial. When the valves are arranged in parallel they have to be located in the housing itself. When the valves are opposed in an axially spaced configuration, they have to be sealed from each other to balance fluid pressure. This creates additional friction which, in turn, decreases the sensitivity of operation of the assembly. Furthermore, in known constructions in which the valves are opposed in an axially spaced configuration, movement in an axial direction of an valve-operating assembly common to both valves is capable only of positively opening or closing one valve, the valve-operating member being adapted to unseat a valve member for engagement with a seating of the other valve.

According to our invention, in a fluid control valve assembly of the kind set forth the valves are operable in response to axial movement of the piston by means of a valve-operating assembly which is common to both valves and which incorporates a reversing mechanism constructed and arranged to effect positive movement of a valve in a direction opposite to that in which the piston is being moved axially.

Conveniently the inlet valve comprises a seating with which one end of the valve-operating assembly defining an inlet valve member engages directly when the inlet valve is in the closed position and, when the piston is advanced in the bore, that is to say towards that seating, resilient biassing means embodied in the reversing mechanism causes the inlet valve member to move away from the seating, that is to say relatively towards the piston.

The valve-operating assembly comprises oppositely arranged inlet and outlet valve members for engagement with axially spaced inlet and exhaust seatings, and an enlarged head on one of the valve members is slidably received within a cup-shaped sleeve of which the free end of the skirt engages with an annulus in the region of the peripheral edge of a block of resilient material interposed between the enlarged head and the seating with which the said one valve member is adapted to engage so that a portion of the block inwardly of the annulus is expanded when a compressive force is applied to the annulus by the skirt in response to a force applied to the closed end of the sleeve remote from the other valve member.

Preferably the block is interposed between a head of the inlet valve member and the seating of the inlet valve, and means are incorporated for preventing deformation of the block until after the exhaust valve has closed.

The inlet valve is normally urged into a closed position by means of a compression spring. Conveniently the compression spring also acts as a return spring to urge the piston into a retracted position.

Two embodiments of our invention are illustrated in the accompanying drawings in which:

FIG. 1 is a longitudinal section through an hydraulic control valve assembly for an hydraulic braking system; and FIG. 2 is a longitudinal section similar to FIG. 1 but showing some modifications.

In the hydraulic control valve assembly illustrated in the drawings a housing 1 is provided with an open ended longitudinally extending stepped bore 2 including portions 3 and 4 of smaller and greater diameter. A piston 5 working in the portion of the bore 3 which is of smaller diameter includes a forward extension 6 which is of reduced diameter and which projects into the bore portion 4.

A sleeve 7 of an external diameter less than that of the bore portion 4 is clamped against a shoulder 8 at a step in the change in diameter between the bore portions 3 and 4 by means of a plug 9 which is screwed into the outer end of the bore portion 4. The plug includes a forward extension 10 of reduced diameter which is received within the sleeve 7.

The piston 5 and the plug 9 are formed with co-axial bores 11 and 12 respectively. The bore 11 is counterbored at opposite ends to define enlarged portions 13 and 14 of which the bore portion 13 terminates at the free end of the forward extension 6 and the end of the bore portion 14 remote from the bore 11 leads into a radial port 15 communicating at all times with a radial passage 16 in the housing for connection to a reservoir for hydraulic fluid. Similarly, the bore 12 is counterbored at opposite ends to define bore portions 17 and 18 of which the end of the bore portion 17 remote from the bore 12 is enlarged to define a union 19 for connection to a source of high pressure hydraulic fluid, for example an hydraulic accumulator or pump, and the bore portion 18 adjacent to the bore 12 communicates at all times through complementary radial ports 20 and 21 in the extension 10 and the sleeve 7 respectively with a radial passage 22 in the housing 1 for connection to a wheel brake.

In accordance with the present invention a valve-operating assembly 23 is located within the sleeve 7. The valve-operating assembly comprises an inlet valve member 24 which is slidably guided in the bore portion 18 and includes a pointed end 25 for engagement with an inlet valve seating 26 at the change in diameter between the bore 12 and the bore portion 18. The opposite end of the inlet valve member 24 carries an enlarged head 27 which is received within a cup-shaped sleeve 28 slidably guided within the sleeve 7. The inlet valve member 24 extends through a central opening in a block 29 of rubber or other suitable resilient material clamped between the free end of the forward extension 10 and the head 27 at the free end of the sleeve 28. The closed end wall 30 of the sleeve 28 forms an abutment for an enlarged head 31 at the inner end of an exhaust valve member 32 which is guided to slide in the bore portion 13 and of which its opposite end is pointed at 33 for engagement with an exhaust valve seating 34 at the change in diameter between the bore 11 and the bore portion 13. When the pointed end 33 is spaced from the valve seating 34 the radial outlet passage 22 is in communication with the radial exhaust passage 13 through radial ports 35 in the extension 6, radial ports 37 at a corresponding end of the sleeve 7, and an annular passage 38 is defined by the space between the sleeve 7 and the bore portion 4 of greater diameter. A compression spring 39 acts between the inner end of the piston 5 and an annular abutment member 40 normally to hold the pointed end 33 away from the seating 34. The abutment member 40 is provided in its face adjacent to the sleeve 28 with a counter-bored recess 41 in which is received the head 31 of the exhaust valve member 32. The annular abutment member 40 includes an axially extending eccentrically arranged projection 42 which extends through an opening 43 in the end wall 30 of the sleeve 28 and engages at its inner end with the head 27 of the inlet valve member 24 so that the force in the compression spring 39 is transmitted through the abutment member 40 to the valve member 24 normally to hold the pointed end 25 in engagement with the valve seating 26 thereby cutting off communication between the source of high pressure fluid and the radial outlet passage 22.

In the normal inoperative position illustrated in the drawings the compression spring 39 is operative to urge the piston 5 into a retracted position in which the engagement between the head 31 of the exhaust valve member 32 in the counterbored recess 41 in the abutment member 40 is operative to hold the exhaust valve member 32 away from the seating 34. Similarly, as described above, the inlet valve member 24 is urged into engagement with the seating 26 by the compression spring 39.

When the piston 5 is advanced in the bore initial movement of the piston compresses the spring 39 and the force with which the inlet valve member 24 is urged into engagement with the seating 26 is increased. This continues until the seating 34 engages with the pointed end 33 of the valve member 32 to isolate the radial exhaust passage 16 from the space between the inner end of the pistonn 5 and the plug 9 and the outlet passage 22. Thereafter, further movement of the piston 5 in the same direction is transmited to the sleeve 28 through the exhaust valve member 32 which acts as a thrust member or strut. This in turn urges the sleeve 28 forwardly to compress an annular region of the resilient block 29 terminating at its peripheral edge with the result that the central region of the block 29 is expanded and acts on the enlarged head 27 to urge the pointed end 25 positively away from the seating 26. Fluid under pressure from the pressure source is then supplied to the brakes through the outlet passage 22. The high pressure fluid also acts on the inner end of the piston 5 and, when a force applied to the inner end of the piston 5 and equal to the pressure acting over the area, is equal to the operating force applied to the piston, the valve operating assembly 23 and the piston 5 move together in a opposite direction thereby allowing the resilient block 29 to return to its free unstressed condition in which the inlet valve member 24 again engages with the seating 26 to cut-off communication between the high pressure source and the radial outlet passage 22.

When the operating force applied to the piston 5 is relieved, the compression spring 39 acts as a return spring to urge the piston 5 into an inoperative position, moving the seating 34 away from the exhaust valve member 33 whereby the pressure applied to the brakes is exhausted to reservoir.

In the embodiment of FIG. 2 the annular abutment member 40 is omitted and a compression spring 43 acts between the head 27 and the end wall 30 of the sleeve 28. The end of the compression spring 39 remote from the piston 5 abuts against a fixed abutment plate 44 clamped between the shoulder 8 and the inner end of the sleeve 7.

In the inoperative position shown in the drawings the piston 5 is held in its inoperative position by the compression spring 39 and, in this position, the pointed end 33 of the valve member 32 is spaced from the seating 34. The compression spring 43 is operative to hold the pointed end 25 of the valve member 24 in engagement with the seating 26 against the pressure of hydraulic fluid in the high pressure source.

When the piston is advanced in the bore, initially the compression spring 39 is compressed until the seating 34 engages with the pointed end 33 of the exhaust valve member 31. Further movement of the piston 5 in the same direction is transmitted through the exhaust valve member 32 to the sleeve 28 which, as described above, is effective to compress an annular region of the resilient block 29 which expands the central portion to urge the inlet valve member 24 positively away from the seating 26 against the loading in the compression spring 43. This enabled hydraulic fluid under pressure to be supplied to the brakes and, when the force applied to the piston 5 and equal to the pressure of the hydraulic fluid acting over the area of the piston equals the applying load, the piston 5 moves towards its retracted position which enables the valve operating assembly 23 to move with it. Since the compressive force is removed from the resilient block 29, the inlet valve member 24 again engages with the seating 26 with the assistance of the compression spring 43.

The construction and operation of the embodiment of FIG. 2 is otherwise the same as that of FIG. 1 and corresponding reference numerals have been applied to corresponding parts.

The operating force may be applied to the piston 5 directly from the foot pedal or from a foot pedal through an intermediate member providing feel. In another construction the operating force may be applied to the piston 5 from an hydraulic master cylinder, or from a fluid control valve assembly similar to that described in the foregoing embodiments.

In a modification the block 29 of rubber or other resilient material may be replaced by a spring washer or by an annular plate provided with circumferentially spaced and arranged resilient fingers extending radially from a continuous inner or outer annulus.

The fluid control valve assembly in accordance with the embodiments and modifications described above can be utilised in any application where it is desired to regulate hydraulic pressure in proportion to an input load.

I claim:

1. A fluid control valve assembly comprising a housing provided with a bore, an inlet port, an outlet port for communication with said inlet port, and an exhaust port for communication with said outlet port, a piston axially movable in said bore between an inoperative retracted position and an operative advanced position, an inlet valve for controlling communication between said inlet port and said outlet port, an exhaust valve for controlling communication between said outlet port and said exhaust port, and a valve-operating assembly common to both valves and having an operative connection with said piston to open said inlet valve while simultaneously closing said exhaust valve and vice versa as said piston is moved between its operative advanced position and its inoperative retracted position, said valve operating assembly including a reversing mechanism comprising a block of resiliently deformable material, means operative in response to movement of said piston in one direction to engage a portion of said block to compress said portion and simultaneously expand a portion not engaged by said means, and valve operating means connected to one of said valves and having a part engageable by the expanded portion of said block to effect positive movement of the one valve in a direction opposite so that in which said piston is moved axially, said piston, and said inlet and exhaust valves are being aligned axially.

2. A valve assembly as claimed in claim 1 wherein said one valve is the inlet valve and includes a seating, one end of said valve operating means defining an inlet valve member for engagement directly with said seating to close said inlet valve.

3. A fluid control valve assembly comprising a housing provided with a bore, an inlet port, an outlet port for communication with said inlet port, and an exhaust port for communication with said outlet port, a piston axially movable in said bore and movable between an inoperative retracted position and an operative advanced position, an inlet valve for controlling communication between said inlet port and said outlet port, said inlet valve being closed when said piston is in said inoperative retracted position and open when said piston is in said operative advanced position, an exhaust valve for controlling communication between said outlet port and said exhaust port, said exhaust valve being open when said piston is in said inoperative retracted position and closed when said piston is in said operative advanced position, a valve-operating assembly common to both valves and adapted to effect simultaneous operation of said valves in response to movement of said piston in said bore, and a reversing mechanism incorporated in said valve-operating assembly to effect positive movement of one of said valves in a direction opposite to that in which said piston is being moved axially, wherein spaced inlet and exhaust seatings surround said inlet and exhaust ports, and said valve operating assembly comprises oppositely arranged inlet and outlet valve members for engagement with said inlet and exhaust seatings, a cup-shaped sleeve having a skirt, an end wall closing one end of said skirt, an enlarged head on one of said valve members slidably received within said sleeve, a block of resilient meterial interposed between said enlarged head and said seating with which said one valve member is adapted to engage, and an engagement between the free end of said skirt remote from said end wall and an annulus in the region of the peripheral edge of said block so that a portion of said block inwardly of said annulus is expanded when a compressive force is applied to said annulus by said skirt in response to a force applied to said end wall, whereby the said one valve member is moved away from the said one seating.

4. A valve assembly as claimed in claim 3, wherein said block is interposed between said head of said inlet valve member and said inlet seating, and means are incorporated for preventing deformation of said block until after said exhaust valve has closed.

5. A valve assembly as claimed in claim 3, wherein the other seating is provided in said piston, and the other of said valve members is engagable with said other seating.

6. A valve assembly as claimed in claim 5, incorporating an abutment plate, wherein the said other valve member extends through said abutment plate and acts on said end wall of said sleeve, a projection on the abutment plate engaging with said enlarged head of the said one valve member to transmit to said head a force from said piston until said enlarged head engages with said end wall of the sleeve.

7. A valve assembly as claimed in claim 5, incorporating a fixed abutment in said housing for taking the force applied to said piston until said seating in said piston engages with the said other valve member.

8. A valve assembly as claimed in claim 3 including compression spring means acting between said piston and said inlet valve for normally closing said inlet valve.

9. A valve assembly as claimed in claim 8, wherein said compression spring acts as a return spring to urge said piston into a retracted position.

10. A valve assembly as claimed in claim 3, wherein a compression spring is housed within said sleeve and acts between said enlarged head and the inner face of said end wall.

* * * * *